United States Patent
Lindaman

(10) Patent No.: US 6,216,382 B1
(45) Date of Patent: Apr. 17, 2001

(54) SUPPORTING EXPANDER FOR COLLAPSIBLE HUNTING DECOYS

(76) Inventor: Glenn Lindaman, 690 S. 10th St., Allentown, PA (US) 18103

( * ) Notice: Subject to any disclaimer, the term of this patent is extended or adjusted under 35 U.S.C. 154(b) by 0 days.

(21) Appl. No.: 09/329,287

(22) Filed: Jun. 10, 1999

(51) Int. Cl.$^7$ .................................................. A01M 31/06
(52) U.S. Cl. ............................ 43/2; 446/487; 248/533; 248/156
(58) Field of Search ............................... 43/2, 3; 446/321, 446/330, 359, 487; 248/533, 150, 156

(56) References Cited

U.S. PATENT DOCUMENTS

| | | | | |
|---|---|---|---|---|
| 529,463 | * | 11/1894 | Roberts | 43/3 |
| 892,528 | * | 7/1908 | Kricke | 43/3 |
| 1,366,710 | * | 1/1921 | Anker | 248/156 |
| 1,409,285 | * | 3/1922 | Dennett | 43/3 |
| 1,822,763 | * | 9/1931 | Cook | 43/3 |
| 2,011,480 | * | 8/1935 | Gazalski et al. | 43/3 |
| 2,137,799 | * | 11/1938 | Brandenburg | 108/116 |
| 2,313,353 | * | 3/1943 | Mills | 43/3 |
| 2,435,083 | * | 1/1948 | Johnson | 43/3 |
| 2,439,710 | * | 4/1948 | Banigan | 43/3 |
| 2,478,585 | * | 8/1949 | Kouba | 43/3 |
| 2,545,800 | * | 3/1951 | Viken | 43/3 |
| 2,662,327 | * | 12/1953 | Petersen | 43/3 |
| 2,799,961 | * | 7/1957 | Jaumotte | 43/3 |
| 3,245,168 | * | 4/1966 | Pool | 43/3 |
| 3,470,645 | * | 10/1969 | Mattson | 43/3 |
| 4,251,937 | * | 2/1981 | Curley | 43/3 |
| 4,339,887 | * | 7/1982 | Streeter | 43/2 |
| 4,660,313 | | 4/1987 | Bauernfeind et al. . | |
| 4,689,913 | * | 9/1987 | Brice | 43/3 |
| 4,821,444 | * | 4/1989 | Remus | 43/2 |
| 4,965,953 | | 10/1990 | McKinney . | |
| 5,161,561 | * | 11/1992 | Jamieson | 135/16 |
| 5,233,780 | | 8/1993 | Overhold . | |
| 5,274,942 | | 1/1994 | Lanius . | |
| 5,515,637 | * | 5/1996 | Johnson | 43/2 |
| 5,787,632 | * | 8/1998 | Kraut | 43/1 |
| 5,826,364 | | 10/1998 | Bitting . | |

* cited by examiner

Primary Examiner—Peter M. Poon
Assistant Examiner—James S. Bergin
(74) Attorney, Agent, or Firm—Duane Morris & Heckscher LLP

(57) ABSTRACT

A manually manipulated expander spaces the opposite walls of the body of a flexible hollow animal decoy, such as a turkey decoy. The decoy has outwardly convex flexible walls, one of which is collapsed inwardly by inverting it against the other, thus flattening the decoy for transport. The expander is associated with a vertical support pillar or shaft, which carries the decoy on the ground. Bracing portions of the expander extend for example in opposite directions, to contact and space the walls. In an integral expander embodiment the walls are braced open by two opposite arms or by the peripheral edges of a thin two dimensional shape complementing a cross section of the hollow opening between the walls. The expander is then rotated 90° to place either the wider or thinner expander cross section between the decoy walls. The expander also can have a mechanism with relatively movable parts such as pivotable arms that extend or retract by a manual manipulation, for example by operating a slide hub on the support pillar similar to that of an umbrella. The expander can be retrofit into a decoy body and separately removable or attached. The decoy is unobtrusively deployed by a hunter, using the expander to open and set up the flattened decoy in a quick movement.

14 Claims, 11 Drawing Sheets

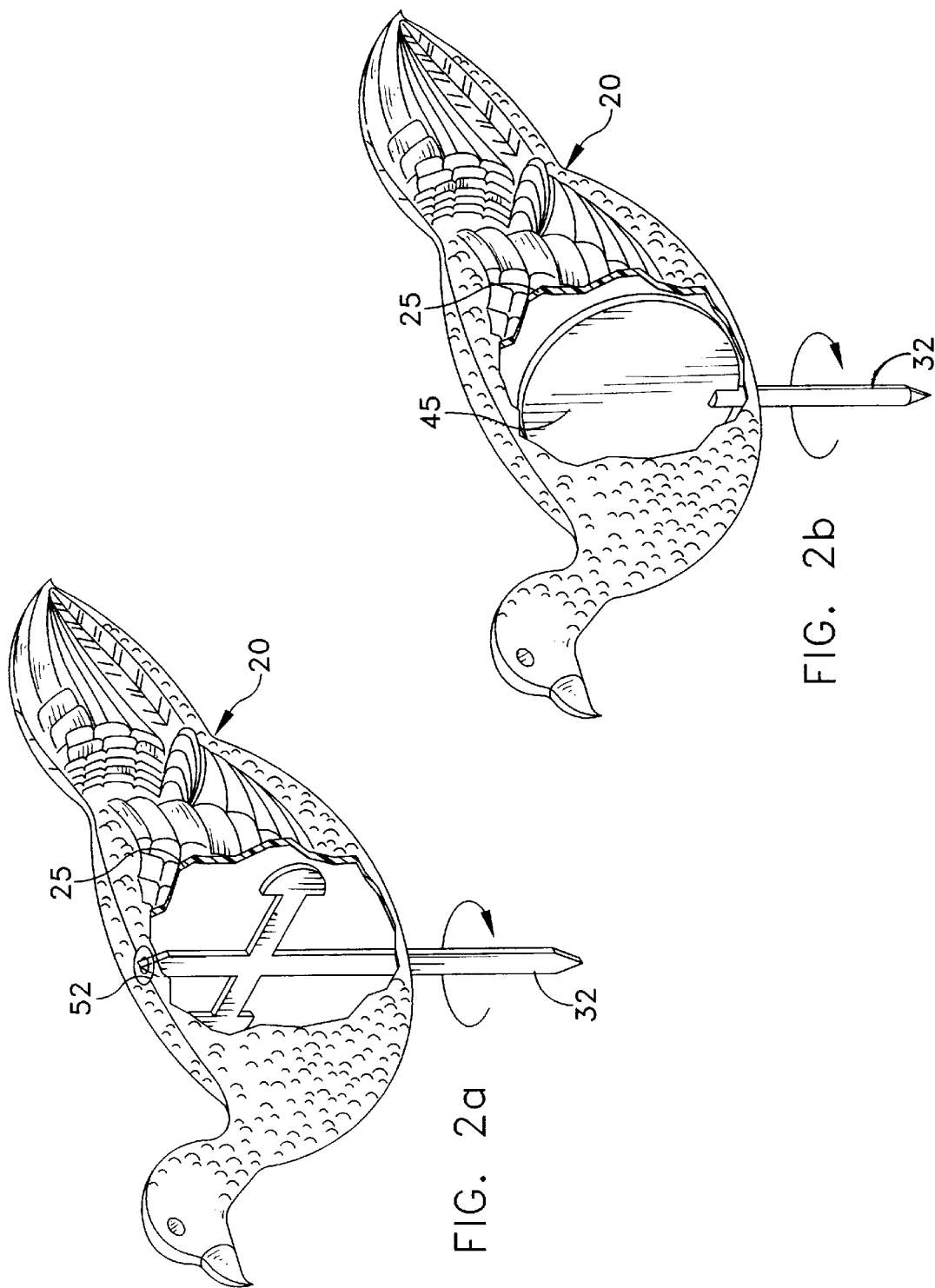

SUPPORTING EXPANDER FOR COLLAPSIBLE HUNTING DECOYS

BACKGROUND OF THE INVENTION

1. Field of the Invention

The invention relates to hunting decoys of the type having flexible molded hollow bodies that hold a three dimensional shape, but are collapsible to flatten, fold or similarly compress the body for compact storage or transport. According to the invention an internal support or spacer is provided to positively open the collapsible body. The support is optionally associated with a vertical post that visually approximates a leg and has one or more outward surfaces that can be caused to bear against the walls of the hollow decoy body from the inside.

The support is configured to reside compactly between the opposite sides of the hollow body when the body is collapsed. For example the support can be wide and flat, and turned 90° between a collapsed and expanded state of the decoy body. Alternatively the support can be movably collapsible and expandable. In the expanded state the support provides a lateral spacing structure that is at least partly complementary to the internal dimensions of the expanded body.

2. Prior Art

Decoys are known in various shapes and colors to resemble specific animals, a familiar example being game birds. Decoys may represent male or female animals. The decoys may be attractive to the corresponding species of game animal or to a different species, for example due to herding, flocking or similar safety-in-numbers instincts, or due to an instinctive belief that if other animals are safely occupying a particular location, that the location must be relatively safe or may contain food or some other advantage which the earlier arriving animals have discovered. In some instances and perhaps at certain seasons, gender specific decoys attract animals of the opposite gender due to interest in potential mates. Gender specific decoys may attract animals of the same gender, especially in the case of territorially exclusive animals that will approach a decoy in the interest of driving competing animals away. Decoys may be attractive if they represent a usual prey species of a predatory animal. Conversely, a "decoy" that represents a predator species may be desirable to discourage the presence of a particular prey species, as with a scarecrow. In the usual case, a decoy is intended to resemble a particular species as accurately and completely as possible. In other cases it is sufficient if the decoy simply has critical attributes in common with the particular species, such as a comparable silhouette, color, movement, sound, odor, etc.

The present invention is applicable generally to visual decoys that are intended to approximate a particular appearance, and in a preferred embodiment also to effect minimal motion. The decoys may represent any species and/or gender to which animals are instinctively responsive. A particularly demanding subject as well as a good demonstrative example is the American wild turkey. The turkey is a relatively intelligent animal and has acute senses. Turkeys are suspicious and wary. Male turkeys are territorial and turkeys of the either gender may approach others of like gender to establish dominance in the so-called pecking order. Turkeys can fly a reasonable distance and thus can very quickly move about in response to situations. Although the turkey is a good example of the aspects of the present invention, it should be appreciated that the invention is also applicable to other particular species, to animals frequenting dry or wet lands, to mammals as well as birds, etc.

Effective decoys for turkeys and similar animals are preferably realistic in appearance, especially from a distance. In order to be practical for the hunter, the decoys must be deployed in the environs in which wild turkeys can be found, sufficiently quickly that the hunter can conceal himself before discovery, and in situations that the turkeys find attractive. Unlike water fowl, which predictably seek out and occupy particular open watercourses along a flyway, turkeys move about and roost unpredictably. A turkey hunter is not likely to be successful simply by selecting a location that seems likely to be visited by turkeys because of certain aspects of cover and perhaps available food. Although such a site selection is helpful, turkeys are not as predictable, for example, as ducks and some other game animals regarding their chosen surroundings. Accordingly, the turkey hunter typically will check several potential hunting locations having cover or food availability that may be appealing to turkeys, or locations where turkeys have been previously observed, while watching and listening for turkey calls. The hunter may wish to try active steps such as imitating turkey calls at these locations and hopefully to invoke a response that reveals the presence of a bird. Advantageously, the hunter would prefer to investigate a location in this manner before expending the time and trouble of erecting decoys, and perhaps risking inadvertent suspicious noise that could scare a turkey off.

In short, the hunter typically does not deploy decoys at a chosen location and then sit and wait. It is more efficient for the hunter to move quietly and to watch and listen, perhaps imitating calls, until one or more turkeys is detected nearby, e.g., by answering the hunter's imitation call. According to this scenario, the hunter has little time to place the decoys. The decoys must be erected when a turkey is nearby and possibly in range to detect inadvertent sounds. And to maximize the chance of success, the hunter would prefer to spend time imitating audible turkey calls instead of setting up decoys.

This general hunting procedure of stalking and investigating by imitating calls, followed by deployment of decoys, puts demands on the hunter and on the decoys. The decoys must be lightweight and compact to be easily transported by the hunter to a site where turkeys are found. To avoid detection by the wary game, the decoys need to be deployed as quickly and as quietly as possible. Interests in transportability and speed or ease of deployment can be met in some ways that detract from the extent to which the decoys realistically depict the animal. For example, the decoys could be flat silhouettes rather than more realistic three dimensional forms. Thus there are competing interests to be addressed.

A known type of three dimensional decoy that can be collapsed for transport and expanded into a stable shape resembling a game animal, comprises a hollow body of flexible molded plastic foam. Such hollow molded decoys resembling turkeys are available, for example, from Feather Flex Decoys, Division of Outland Sports, Inc., 4500 Doniphan Drive, Neosho, Mo. 64850. A hollow foamed plastic decoy is lighter and more transportable than the solid decoy that is typical of floating waterfowl decoys.

The Feather Flex turkey decoy is made of thin sheet segments of molded foam plastic. The segments define molded three dimensional shapes representing surface portions of the animal, generally outwardly convex shapes, bonded together to form the external dimensions of the decoy. This type of decoy is realistic in its gross external shape (and thus its silhouette), and also in finer attributes of surface configuration and color, which are molded into and painted onto the foam plastic sheet material. For a turkey these details include representations of the wings, tail, body and flight feathers, eyes, beak, etc.

The molded foam plastic material is lightweight and inexpensive. The Feather Flex decoy is molded in two lateral halves abutting along a central longitudinal plane. Each half is a generally bowl-shaped mirror image of the other half of the three dimensional bird form. Thus the halves divide the decoy along a longitudinal vertical midplane. The foamed plastic is approximately 0.3 cm thick, subject to the variations in thickness that represent surface features.

Although the foamed plastic is sheetlike, it tends to hold the external shape of the bird because the convexly curved surfaces are stable. The halves are joined together adhesively or by heat bonding along the abutment of the lateral halves, along longitudinal dorsal and medial seams. The decoy resembles a relatively large and heavy bird, but its hollow foam plastic material makes it light in weight. The decoy also is collapsible for transport or storage. The convex curve, preferably of a complete lateral side, is compressed or pushed inwardly until it pops into a stable concave shape resting against the inside surface of the other lateral half. The lateral halves each assume either a convex or concave shape at rest, and either can be compressed or inverted inwardly against the other half. When thus compressed, the body is curved but flattened, and can be further folded in half, rolled and/or compressed into an even more compact collapsed form. A number of decoys collapsed in this manner can be readily stored on the hunter's person and carried into the field.

The decoys are deployed in a reverse manner. The compressed decoy is unrolled or unfolded into its compressed shape in which one of the sides is pressed concavely inwardly to rest against the inner surface of the other. The lateral halves then must be separated from one another so that the concave compressed side pops back out into its convex shape resembling the three dimensional bird. For this purpose, a hand-sized opening is provided along the seam between the molded halves at the lower rear part of the decoy. The hunter expands the decoy back to its three dimensional shape by reaching through the opening and into the internal space between the halves and pressing and/or patting the inverted concave side outwardly from within until it pops fully into its convex shape, thus opening out the hollow interior. The expanded decoy resumes its stable three dimensional doubly convex shape until again collapsed for storage and transport.

In addition to the Feather Flex decoy discussed above, a molded foam plastic decoy that is shaped in joined lateral halves to resemble a three dimensional figure is disclosed, for example, in U.S. Pat. No. 4,821,444—Remus. The halves are vacuum or pressure thermoformed from a flexible, closed-cell expanded foam such as a polyethylene foam. Preferably, the foamed material is cross linked by an irradiation process that produces a convincing feather-like surface texture.

In U.S. Pat. No. 4,339,887—Streeter, a molded decoy in the specific form of a female turkey is formed of a polyurethane foam or a combination of polyurethane and polystyrene. These materials are also considered to provide good surface detail in the finished decoy.

Both Remus and Streeter teach the use of stick-like rods to support the decoy when it is deployed, in lieu of legs. One end of each such leg rod fits snugly into a receptacle in the decoy body. The opposite end is pressed into the ground to hold the lightweight form upright. In Remus, each molded half is integrally complete, but for the supporting leg rods. Streeter teaches removable parts, in particular the head. The removed head and leg rods of Streeter can be stored within the hollow body cavity. The disclosures of the Remus and Streeter patents are incorporated for their teachings regarding materials and molding processes for the flexible sheet molded foamed plastic halves.

Turkey decoys available from Feather Flex Decoys, identified above, use a single supporting rod rather than two spaced leg rods. In addition, the supporting rod is received only loosely in the decoy body. The decoy has a grommet along the dorsal seam, and the body is balanced on the pointed upper end of the single support rod, on which the grommet is rested. The lower end of the support rod is pressed vertically into the ground. The upper end point of the support rod is loosely engaged by the grommet along the seam along the back of the decoy, which preferably is at a high point closer to the front of the decoy than to the rear. The decoy body is elongated (like the bird it represents), and as mounted on the pointed post the body can rotate like a weather vane in the wind. If movement of the body is restricted only by the grommet on the back of the body being engaged on the pointed support rod, the body could pitch and yaw relative to the engagement of the grommet and the support rod. However the lower portion of the support rod passes through a second hole in the bottom of the body, placed forward of the hand-sized opening and sized to complement the support rod. This restricts movement of the body to rotation about a vertical axis defined by the support rod. Such rotational movement is believed to make the decoy more attractive or interesting to the targeted game bird than a stationary decoy (or perhaps more aggravating as a challenge to a territorial game bird).

The Feather Flex decoy and the other similar decoys that have "evolved" are beneficial in many respects, including their ease of collapse for transport, their minimal weight, and their realistic representation of a game bird. However, these decoys are not quickly and silently deployable by the hunter. As discussed above, the hunter should advantageously be able to set up the decoys at a spur-of-the-moment hunting area, as unobtrusively as possible to avoid alerting birds in the area to the hunter's presence. Deployment should be quick, substantially silent and unaccompanied by a great deal of movement.

The hunter advantageously sets up not one decoy but several. In the case of turkeys, the hunter might choose to set up several hen decoys, or perhaps several hens and a tom. A tom may be distinctly more rotund and striking than a hen, due to his breeding display of puffed-up body feathers, posed lifted wings and fanned tail feathers. An impressive such display is appealing to hens and is a challenge by other toms.

The hunter calls the game birds audibly to detect their presence initially. The hunter deploys the decoys and after the decoys are deployed continues to call, whereupon the visual appearance of the decoys and the audible calls supplement one another. The calls can include clucking noises characteristic of hen birds and gobbling noises that characterize the territorial challenge of a tom.

The set up steps required for known decoys and the time spent setting up the decoys detract from their usefulness. The Feather Flex decoy must be extracted from where it is carried by the hunter, and unrolled or unfolded. To expand the collapsed body the hunter reaches into the hollow decoy form through the opening in the bottom and presses and pats the inverted lateral half outwardly from the other. Both sides are to assume the proper convex shape without dents or remaining collapsed areas.

Having expanded the Feather Flex decoy body, the hunter must set the pointed upper end of the support rod in the decoy body and the lower end in the ground. The support rod can be passed through the bottom hole in the body and aligned and engaged at the top of the body such that the grommet on the back fits over the pointed end of the support rod. This requires a substantial amount of visual alignment, tactile feeling around, trial and error, especially as the hunter tries to find the grommet with the pointed end of the support rod, or vice versa. The support rod can be brought to the grommet opening from within the decoy before setting the support rod in the ground, but this must be done blindly because the support rod is concealed in the body. Alternatively, after setting the support rod in the ground, the grommet can be guided to the pointed end of the support rod by moving the expanded body about while peering through the opening in the grommet for the pointed end. These operations are obviously clumsy, time consuming and possibly accompanied by conspicuous noise and movement. Furthermore, after setting up a decoy and properly placing it on a support rod, the lightweight decoy body can easily be dislodged from the pointed end of the support rod, for example by bumping the body, whereupon it is necessary to start over again with the operation of aligning the grommet and the pointed end of the support rod.

It would be advantageous if a decoy as described could be deployed more quickly and dependably, while retaining the effectiveness or known decoys in attracting game, as well as their ease of transport.

SUMMARY OF THE INVENTION

It is an object of the invention to improve collapsible hollow body decoys by providing a convenient expander for such decoy bodies, useful manually to very quickly and quietly apply sufficient internal pressure to open out a collapsed or flattened decoy body into its game-resembling shape.

It is also an object to provide such an expander in conjunction with a vertical support post or standard on which the decoy body is carried when deployed, enabling a hunter to open the decoy body positively and in substantially the same motion to set up and support the decoy body for attracting game.

It is a further object to provide an expander for hollow decoy bodies that is sufficiently convenient that a number of decoy bodies can be surreptitiously expanded or erected and set into place, even after the hunter has determined that a targeted game animal is approaching or in the area.

It is another object to embody such the expander very inexpensively and durably as an integral or rigid member for exerting a laterally outward force from within the hollow body, the solid member being substantially flat and having a width at least partly complementing a planar cross section of the inside hollow volume of the hollow body when properly expanded, the solid member being movable manually from a stowed orientation directly between opposite sides of the hollow body when collapsed together, to a deployed orientation angularly displaced from the stowed orientation, in which the expander exerts a laterally outward force for expanding the hollow body by inside-out pressure.

It is a further object in an alternative embodiment to configure the expander as a mechanism having relatively movable parts, at least one of which bears outwardly from a collapsed position of the expander to an opened deployed position for similarly exerting such laterally outward force for expanding the hollow body.

It is another object to provide an expander as described, that can be retrofit readily into hollow body decoys that are already in use.

These and other objects are accomplished by an expander device that is inserted into and manually manipulated in an internal hollow of a hollow collapsible decoy body, into an expanding state for exerting a laterally outward force whereby collapsed sides of the decoy body are relatively displaced outwardly for expanding the decoy body from a flattened collapsed state to an opened deployed state. The expander also has a stowing state in which the expander is retracted from the expanding state such that the expander can reside inside the hollow body when the hollow body is collapsed such that a normally outwardly convex wall of the body is collapsed inwardly into a concave shape resting against an opposite outwardly convex wall of the body. The expander can be a relatively wide and flat integral member having a width that is at least partly complementary with the internal volume of the body along a plane including at least one body side to be expanded. In that case the expander can be rotated between the expanded state in which the expander is disposed in said plane, and the collapsed state in which the expander is angularly turned out of the plane to permit said body side to be collapsed inwardly.

Preferably the expander is attached to or associated with a vertical support post that can be pushed into or otherwise engaged with the ground for holding the decoy body upright. Such support post can be initially attached to the decoy body, for example by a fastener aligned to the support post, or can be retrofit, with or without the fastener.

In an alternative embodiment the expander comprises a mechanism with relatively movable parts that are collapsed together in the collapsed state and are manually manipulated such that a bracing member of the mechanism is diverted in a direction of said body side for urging the body side into the expanded state. This mechanism can have a pivotable strut coupled between the bracing member and a sliding control that is movable along a vertical supporting post to alternatively expand the decoy body by moving the bracing member toward the body side and to allow collapse of the decoy body when the bracing member is moved away from the body side and toward the vertical supporting post.

The expander is insertable or fixedly mounted in the flexible hollow decoy body. The body can resemble a turkey or another animal that resembles a hunted species or a species that is of attractive or repulsive interest to a targeted species. The decoy of the invention, or a retrofit decoy body containing the inventive expander, can be very quickly deployed from a flattened and/or folded collapsed state by a hunter in the field. The decoy body is made of a thin foamed molded plastic material, in bilaterally symmetrical parts. These parts are fused along longitudinal dorsal and medial seams, with openings in one or both of the dorsal and medial seams for passage or engagement of the vertical support post and/or for manual access to the interior of the hollow body for manipulation of the expander.

The molded decoy body or the like is collapsed by turning one bilaterally symmetrical normally-outwardly-convex part of the body inwardly to a concave position in which said normally-outwardly convex part is flattened and displaced inwardly to rest against the other against the other of the bilaterally symmetrical parts. The expander can remain in the decoy body during this process, and also can remain in the body when the body is further reduced in size by folding the body as already flattened. The expander can be permanently attached with a fastener or simply rested in the body, and also can be a part that is normally removed between uses.

In the embodiment in which the expander comprises a mechanism with relatively movable parts, a supporting pillar or shaft can be disposed vertically to ultimately carry the decoy body relative to the ground. An elongated bracing member can be pivoted outwardly or back against the shaft, to extend from the pillar and press the body wall outwardly from inside in the expanded position or to permit the body wall to collapse inwardly. The pillar/shaft can be rotatably mountable on a base formed by a stake that is pressed into the ground and telescopically receives the pillar, which can be a telescoping cylindrical shaft or tube. Alternatively, the pillar can be directly insertable in the ground and rotatably coupled to the remainder of the expander. The pillar of the mechanism (or the support post for the integral flat expander embodiment) is accessible through a complementary opening in the medial longitudinal seam along the bottom of the body. Alternatively the opening can be large enough to admit the hunter's hand, or a second opening can be provided along the bottom, in either case permitting the user to reach into the body to operate the mechanism and/or to expand the decoy body by positioning the integral expander.

The pillar of the mechanism or support post for the integral flat expander can be simply placed in the body but preferably is attached to the body, for example by a fastener passed through an opening in the dorsal seam and into an upper end of the pillar or post. The expander can have one or several bracing members associated with a mechanism or one or several planar spacers for occupying cross sectional planes in the decoy body at different angles around the vertical pillar or post. The mechanism embodiment can be structurally similar to the expansion/collapse mechanism of an umbrella with linkages movable by a sliding hub against spring bias between latched positions for diverting spacing ribs outwardly from a vertical shaft, except with the outer portions of the ribs having a shape complementing the hollow inside of the body. Alternatively the mechanism can be substantially simplified, for example having frictionally fixed positions instead of latched positions and having a sliding hub that contacts the ribs or bracing members directly.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings

FIG. 2*a* is a cutaway perspective view of the decoy and an expander according to a first embodiment in which the expander is rotatable and has laterally protruding contact arms.

FIG. 2*b* is a cut-away perspective view of the decoy and an expander according to a second embodiment in which the expander comprises a flat rotatable panel of complementary size and shape to the inside of the decoy body as properly expanded.

DETAILED DESCRIPTION OF THE PREFERRED EMBODIMENTS

Figure 1:
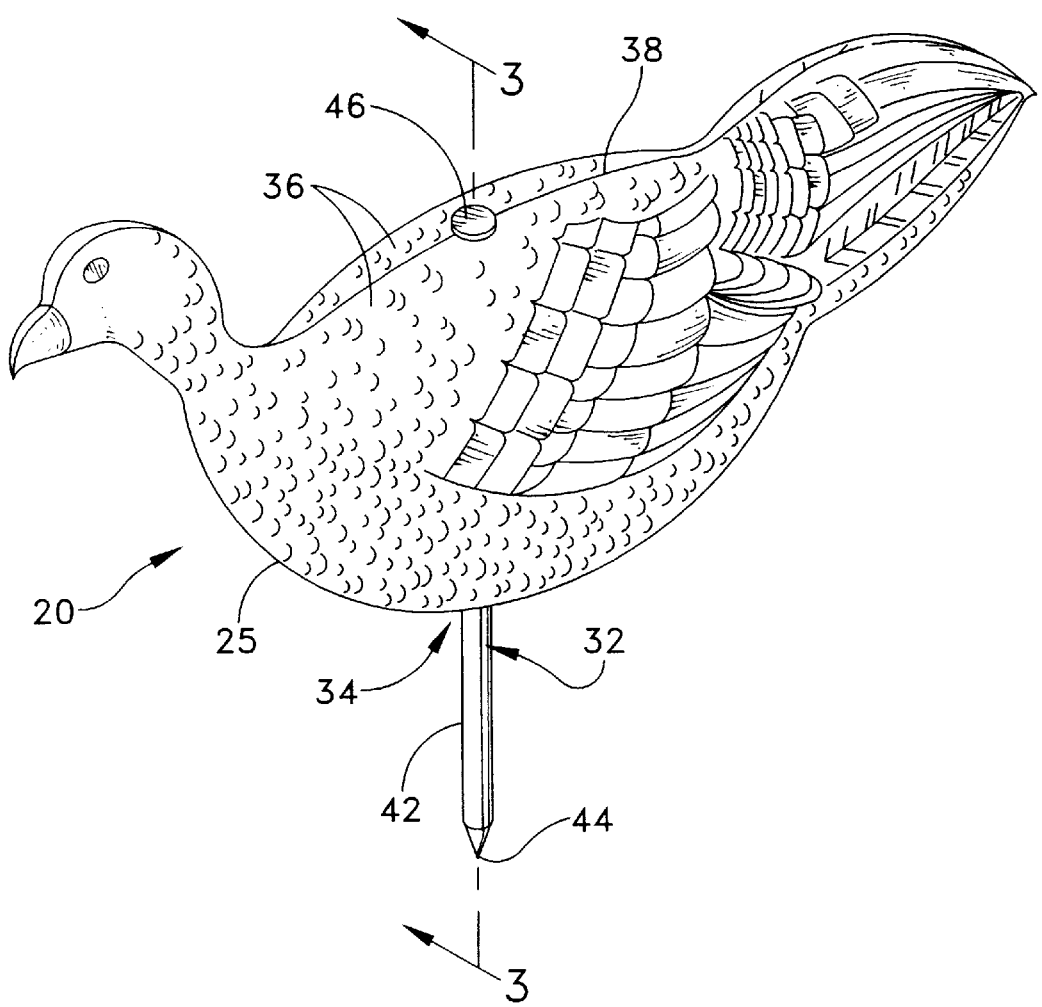
FIG. 1 is a perspective view showing a mechanically expandable decoy comprising a hollow collapsible decoy and expander according to the invention, in particular a hen turkey.

Referring to FIG. 1, a hunting decoy 20 is provided according to the invention and contains an expander that is manipulated by the hunter when deploying the decoy or when collapsing and stowing away the decoy. The hollow body of the decoy can be positively expanded into the shape shown, or collapsed flat. The decoy is molded in two resilient halves along a longitudinal plane. When collapsed flat, one of the opposite lateral sides of the hollow body, which normally protrudes laterally in a generally convex shape corresponding to the shape of the animal, is pressed laterally inwardly and inverted into a concave shape that rests against the opposite lateral side of the hollow body, which remains outwardly convex. The expander of the invention allows a simple manual manipulation to force the hollow body back open into its expanded state shown in FIG. 1.

In the expanded state the decoy substantially resembles the external appearance of an animal intended to interest a target game animal. In the illustrated embodiment the decoy resembles a hen or female turkey (or perhaps an adolescent male turkey or "jake"). This type of decoy is intended to attract other turkeys, that is, animals of the same species. In general, decoys representing either gender of turkey are of sufficient interest to members of both genders to be useful for hunting. The invention is also applicable to other species and to other situations in which a decoy is of interest to a target animal for any reason. For example the decoy may represent an animal of the same species, a prey animal, or even a predator animal in the event the target animal is to be repelled rather than attracted, etc.

Figure 2C:
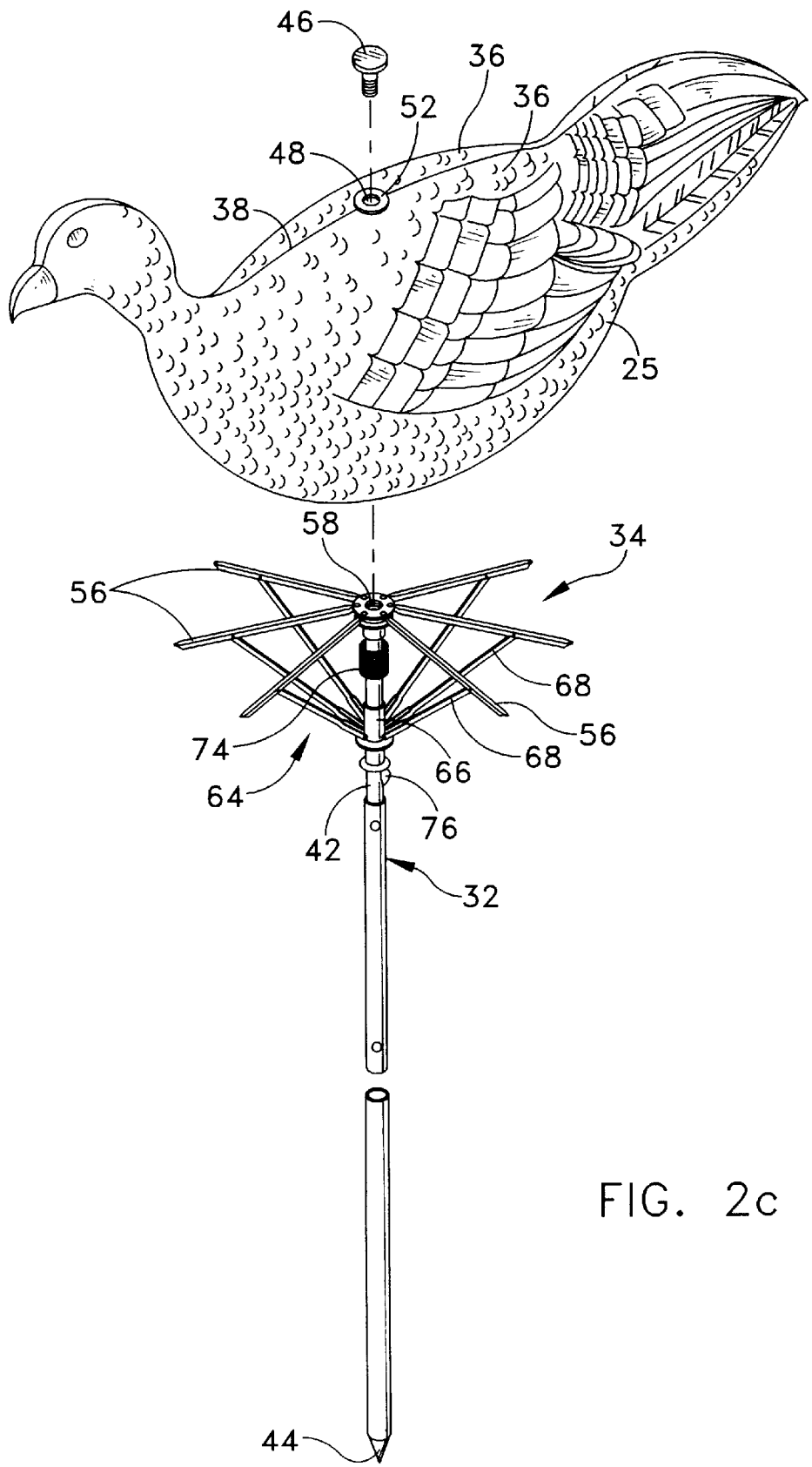
FIG. 2*c* is an exploded perspective view of the decoy and an expander according to a further embodiment in which the expander comprises contact arms that are relatively movable via a manually manipulated mechanism.

The decoy 20 comprises a collapsible hollow decoy body 25 supported on a supporting shaft, shown generally in FIG. 1. The supporting shaft can be an integral pointed shaft 32 as shown in FIGS. 2*a*, 2*b* or a telescoping length adjustable shaft 42 as in FIG. 2*c*. In any event, the shaft is pressed into the ground to support the decoy 20 upright. The telescoping support shaft 42 can be part of an expander that is manipulated to enlarge the decoy body when collapsed, into the expanded state shown. The support shaft can be attached to the hollow body at the upper end or loosely received in a grommet or similar fixture (not shown in FIG. 1) permitting free rotation of the body relative to the support shaft. The support shaft can be separate from the structure that effects the expansion or attached thereto either rigidly or for relative movement, as discussed below. In a simple embodiment the expander comprises a flat panel shaped to complement the internal shape of the decoy body when expanded, integrally joined to the support shaft and arranged to rotate on a vertical axis corresponding to the support shaft, into and out of its operative expanding position. In further embodiments, the expander can comprise the relatively movable parts of a mechanism that is operable to expand the decoy body 25 as well as to support it.

The body 25 comprises a thin flexible material defining an internal cavity. The body resembles a game animal at least in its general shape or outline, such that the decoy 20 has a silhouette resembling the animal. Preferably the body of the decoy also has molded surface details representing feathers and other features and also is painted or otherwise colored or shaded to appear as the animal. In a preferred embodiment the body comprises a thin foam plastic such as polyethylene or polyurethane thermoset foam of 1 cm thickness or less, and preferably about 0.3 cm thickness. This foam plastic is molded not only to define the required external shape, but also to define surface details resembling body feathers, tail feathers, wings and other features of the animal that the decoy represents.

The hollow body 25 of the decoy can be formed in bilaterally symmetrical mirror image halves 36. Although larger in the middle and smaller at the head and tail, each of the halves is generally bowl shaped and in the expanded state protrudes from the other in an outwardly convex shape. The mirror image halves 36 can be molded separately and joined, for example adhesively or by welding or otherwise bonding with heat or curing, along a seam 38 that bisects body 25 along a longitudinal centerline or vertical midplane.

The decoy body 25 is held upright relative to an underlayment such as the ground (not shown in FIG. 1) by a support pillar or shaft 42 (or 32) that is preferably oriented vertically. The pillar or shaft could define a wide, blunt and/or weighted base or the like, but preferably comprises a shaft with a thin or pointed lower end 44 that can be pressed directly into soft ground.

Figure 3:
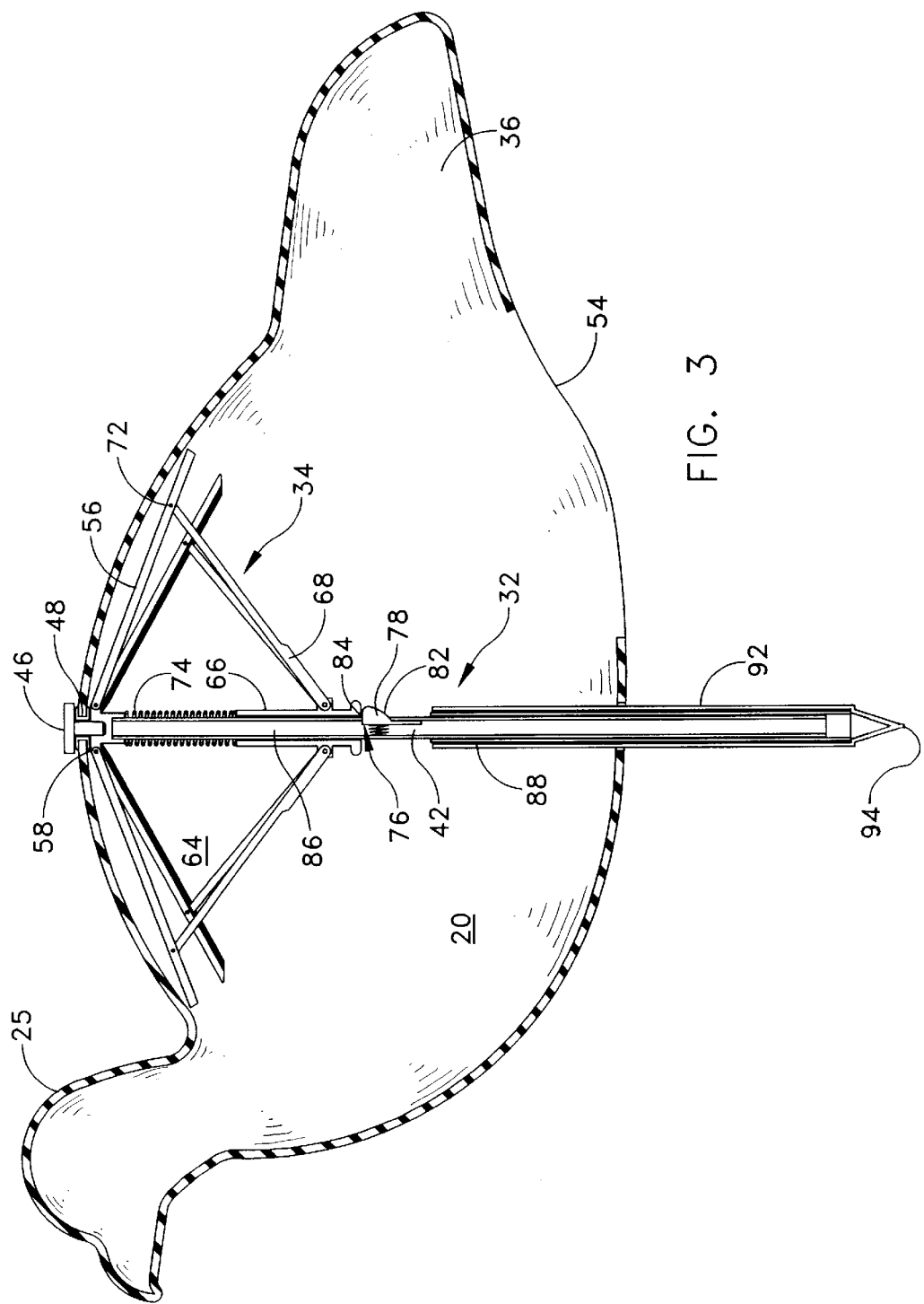
FIG. 3 is a section view taken along line 3—3 in FIG. 1, representing the embodiment of FIG. 2*c*.
Figure 4:
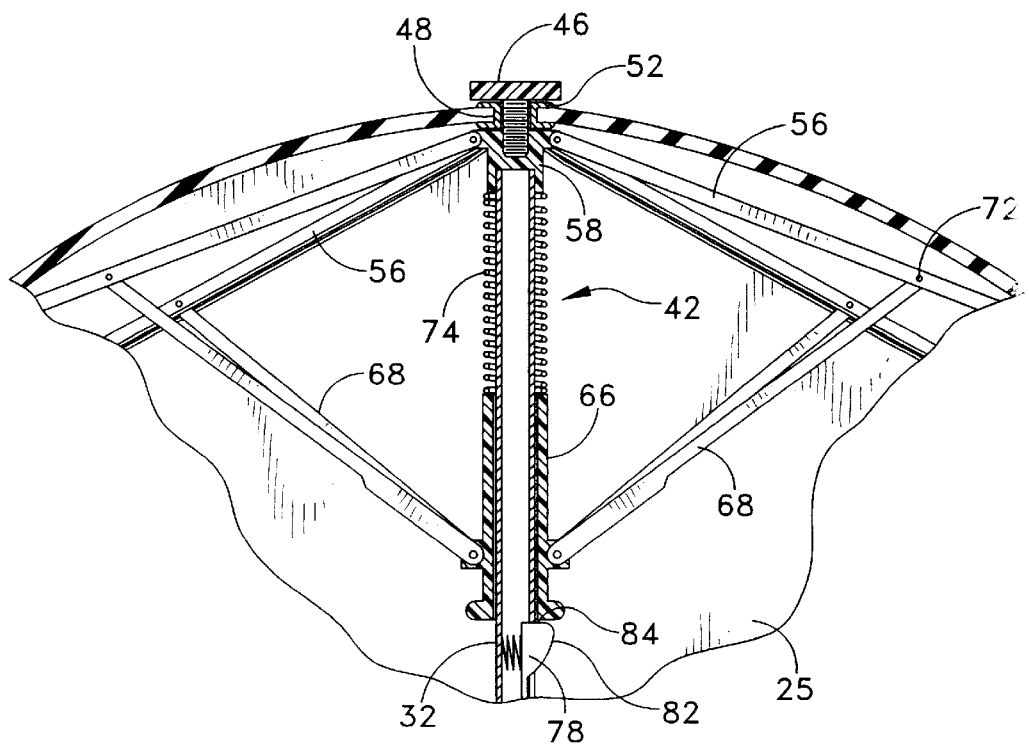
FIG. 4 is a detail section view corresponding to FIG. 3 and showing the junction of the expansion mechanism and the decoy body.
Figure 5:
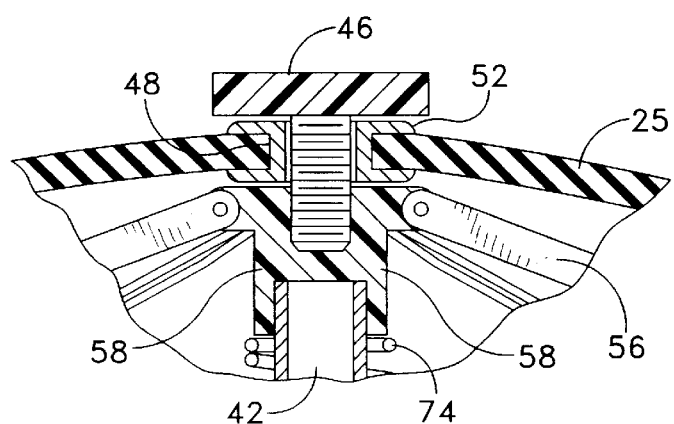
FIG. 5 is a detail section view corresponding to FIG. 4 and specifically showing the attachment of the expansion mechanism and the decoy body.

The decoy 20 and the expander 34 which may be integral with or coupled to the supporting pillar 32 (or 42), are shown in exploded view in FIGS. 2a through 2c, according to several exemplary variations. FIGS. 3–5 represent the structurally more complicated mechanism of FIG. 2c. The remaining drawing figures represent aspects that may be incorporated with any of the alternative embodiments shown.

The support pillar or shaft 42 in FIG. 1 extends through the hollow internal volume of decoy body 25, intersecting the bottom and the top of the molded material of body 25. The top end the support pillar can be affixed to hollow body 25 (along the back of the bird) by a fastener 46 such as a threaded finger screw that extends through an opening 48 on the top of body 25, and engages in the top of support pillar 42. According to additional embodiments discussed below, the support pillar can be fixed relative to the body by any or all of several structural engagements. For example, the support pillar can rotatably support the body as rested on top of the support pillar, or can be affixed by insertion of the support pillar through a complementary-sized hole in the bottom of the body, or held in place by attachment to the expander portion, which in turn is held in place because the expander portion is sized to complement the expanded body. The support pillar and the body can also be relatively positioned by combinations of these structural engagements.

In FIG. 1, the support pillar is affixed at the top of the body. The body 25 has an opening 48 at the top, in which a grommet 52 is set as shown in FIGS. 4 and 5. The grommet can be rested rotatably on the top of the support pillar by a conical point or shouldered pin (not shown) that engages the grommet. Alternatively the top of the body 25 can have a simple opening or no opening, in which case the inside surface of the top of the body rests atop the support pillar or on the expander as attached to the support pillar.

The lower end of support pillar 32 or 42 in the embodiment of FIGS. 2a–2c extends through an opening 54 in the bottom of decoy body 25 (the belly of the bird). The support pillar supports body 25 at a distance from the ground or other underlayment substantially equal to the distance between the body of a live bird and the ground, when the bird is standing normally on its legs. Thus the part of the support pillar that is outside of the body has a silhouette resembling legs.

The expander can be integral with and carried directly on support pillar 32, and can have any of various different forms that are elongated at least in a direction perpendicular to the longitudinal axis of body 25 when functioning to hold body 25 in an expanded state, and either are not elongated or are elongated in a direction other than perpendicular to the axis of body 25 when the body is collapsed for storage. The panel or laterally elongated part of the expander can also be a separate part from the support pillar 32 or 42. Some exemplary embodiments are shown in FIGS. 2a–2c.

In FIG. 2a, the expander comprises a support pillar 32 that is integrally attached to lateral arms 43. In the position shown, the expander including its opposite arms 43 is elongated in a direction perpendicular to the longitudinal axis of body 25. Arms 43 thus positively space the opposite side walls of the body in this position. The expander is also substantially planar or thin in a direction perpendicular to its elongation. Thus the expander can reside between the side walls of body 25 when they are collapsed together, namely with the thin or smallest dimension of the expander between the collapsed-inward side walls. In particular, the substantially planar expander can be rotated 90° on a vertical axis relative to the position shown in FIG. 2a, and as so rotated presents its smallest dimension laterally of the longitudinal axis of body 25. In use, the hunter either inserts the expander when preparing to expand the decoy for deployment, or leaves the expander in place at all times. When the decoy is collapsed the expander is turned 90° from the orientation shown in FIG. 2a, and when the decoy is expanded for deployment the expander is turned relative to the body (or the body relative to the expander) to orient the expander in the position shown. The embodiment of FIG. 2b is similar to that of FIG. 2a. In FIG. 2a, the expander has two oppositely extending bracing members, namely lateral arms 43, which bear against the inside surface of the side walls of body 25 in the expanded position. In FIG. 2b, the expander has a single bracing member 45 which extends laterally, and is shaped to complement the internal space within body 25 along a lateral cross section through the body as expanded. In order to expand body 25 from a position in which one side wall is collapsed into an outwardly concave shape against the opposite side wall, it is only necessary to have an expander with a lateral arm or similar structure extending radially in one direction or in one or more pairs extending in opposite directions. The arm, arms or other structure is turned from a stowed position in which its narrower dimension (thickness in FIGS. 2a, 2b) is disposed between the opposite walls of the hollow body, and a deployed position in which the wider dimension (width in FIGS. 2a, 2b) are laterally aligned to extend between the opposite walls. Thus the elongated structure is turned toward the concavely collapsed side wall of a collapsed decoy body in order to expand it away from the opposite wall, which typically is already in an expanded (outwardly convex) position. The specific structure can be one or more arms as in FIG. 2a or a flat oval 45 or similar shape complementary to a lateral cross section through the hollow of the body as in FIG. 2b. Other fixed or integral shapes are possible, such as an oval hoop or a modified J-shaped wire form that can be turned to space the lateral walls. Preferably, however, the expander extends in opposite directions from a vertical center line of body 25, so that either side wall can be collapsed inwardly and both side walls are spaced by the expander.

In FIGS. 2a and 2b the expander and its lateral arms 43 or laterally elongated panel 45 are integral or fixed with respect to the support pillar 32. The expander also can be a separate element from the support pillar (i.e., not attached to the pillar). In the case where the expander is integral with or is attached to the support pillar, the user can expand the decoy by rotating arms 43 into position by manually grasping and twisting the support pillar 32 from outside the body. In the case where the expander is separate, the user can reach manually into the hollow of body 25, through the hand-sized opening provided in the bottom.

In the embodiment of FIG. 2c, 3 and 4, an expander is provided with relatively movable parts. As with the previous embodiments, the expander presents a minimal lateral thickness in the collapsed state of body 25 and extends laterally at least in one radial direction. According to this embodiment the expander extends radially in several directions radiating from a telescoping support pillar 42. The expander can be symmetrical, in which case the orientation of the expander is not critical, or can be more elongated in the longitudinal direction than laterally, in which case the expander is self aligning because provided the longer dimension is longer than the width between the side walls, the longer dimension will tend to align with the longitudinal axis of body 25.

According to the relatively movable embodiment of FIGS. 2c, 3 and 4, at least one bracing member 56 is coupled to support pillar 42 and is movable between alternate positions in which the bracing member protrudes laterally from support pillar 42 and thereby positively spaces the lateral sides of hollow body 25 from one another, or retracts to a position in which bracing member 56 resides against or is substantially coextensive with support pillar 42, the latter being the collapsed position of the mechanism 34.

The bracing member 56 can be structured according to various possible structures in order to define alternative extended and retracted positions. In the embodiment shown, support pillar 42 and several bracing members 56 form a mechanism similar to that of an umbrella, although with relatively short ribs. The bracing members 56 are pivotally coupled to the support pillar 42 at a boss 58 coupled to the top end of support pillar 42, each of the bracing members 56 being pivotal relative to the boss 58 and relative to support pillar 42 along a pivot axis oriented circumferentially relative to support pillar 42, which is cylindrical. The bracing members 56 thus rotate on axes perpendicular to the elongation of the respective bracing member and to support pillar 42. For this purpose the bracing members 56 can have openings adjacent to their radially inner ends, at which the bracing members 56 are pivoted to boss 58 on a wire (not shown) that passes through the openings and is twisted to wrap in a tight circle around boss 58 to define the pivot axes of each of the bracing members 56 disposed along a circle defined by such wire (i.e., an axis on a tangent to the circularly cylindrical boss 58). The bracing members 56 are movable between a deployed position as shown in FIGS. 2c and 3 in which the bracing members 56 extend radially outwardly from support pillar 42, and a collapsed position in which the bracing members 56 are rotated (downwardly in FIGS. 2c and 3) to rest against support pillar 42.

In the preferred embodiment shown, each bracing member 56 forms part of a linkage 64 that is operable manually to move the respective bracing member 56 between the collapsed position and the deployed position. In addition, linkage 34 holds bracing members 56 in the deployed position, and moves against spring bias to drawing 56 bracing members into the retracted or collapsed position.

With further reference to FIG. 4, a tubular cylindrical hub 66 is slidable manually along support pillar 42, which forms a cylindrical shaft. A diagonally coupled strut 68 is pivotally coupled to cylindrical hub 66 on its radially inner end and to a respective one of bracing members 56 on its radially outer end. The pivotal connection to hub 66 also can be via a wire defining the pivot axes of the struts 68 on the inner end, similar to the structure whereby bracing members 56 are pivoted to the upper end boss 58. Struts 68 are pivotally coupled to the bracing members 56 at a space from end boss 58, for example by rivets 72 that are sufficiently loose to permit pivoting.

Referring to FIGS. 3–5, a helical spring 74 biases sliding hub 66 away from the top end boss 58 and is compressed resiliently when sliding hub 66 is manually pushed upwardly to extend bracing members 56 radially outwardly. The sliding hub 66 can be pushed past a catch device having a spring lock 76 comprising a latching body 78 similar to that of an umbrella, which resiliently extends radially outwardly at a distance below top end boss 58. The latching body 78 of the spring lock 76 is forced radially inwardly against the bias of an internal spring (not shown), either manually by the user or by the sliding hub 66 passing longitudinally over the sloping downward facing side 82 of latching body 78. When the sliding hub 66 passes longitudinally beyond latching body 78, the latching body snaps radially outward and provides an abutment 84 that holds hub 66 against moving longitudinally back down support pillar or shaft 42 toward its collapsed position. When desired to collapse decoy 20, the user depresses latching body 78 to permit sliding hub 66 to pass over it.

Figure 6:
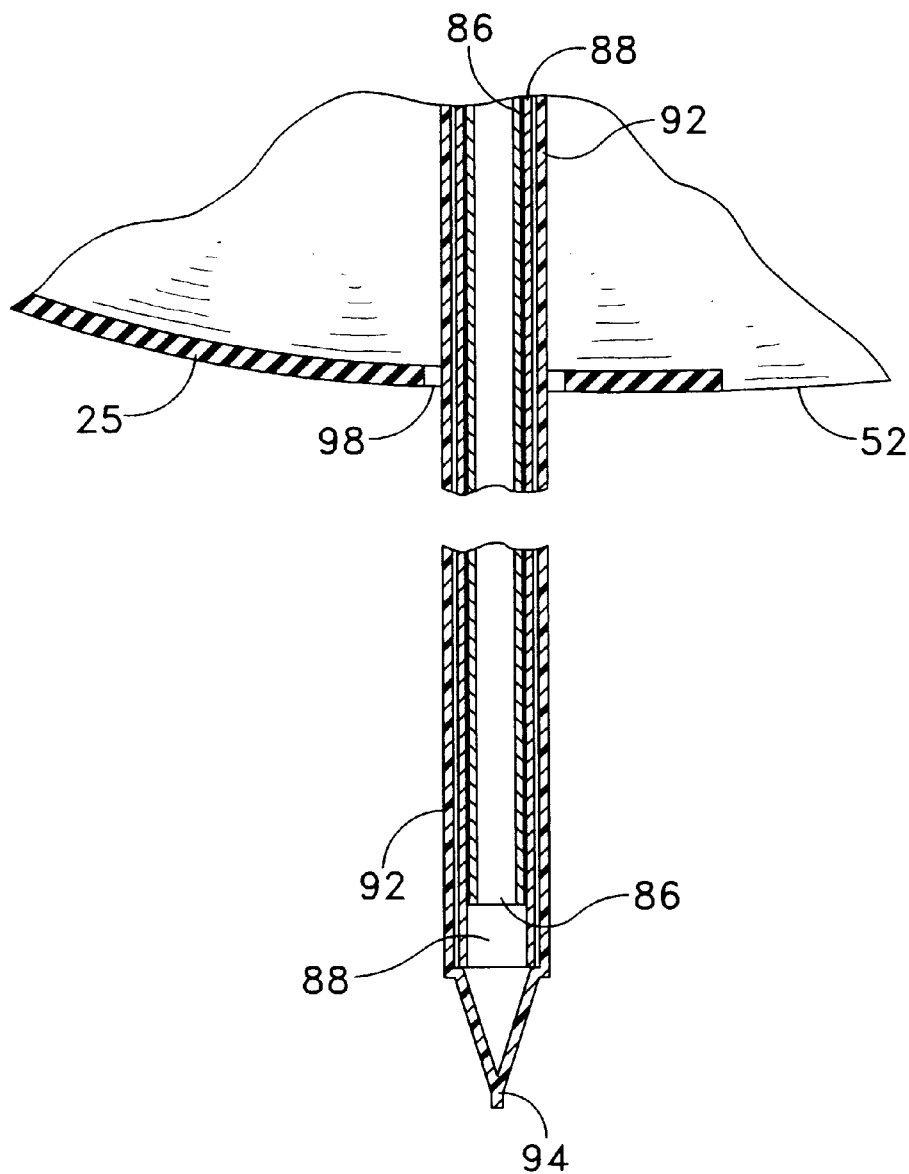
FIG. 6 is a detail section view corresponding to FIG. 3 and showing the lowermost part of the expansion mechanism.

Support pillar or shaft 42 of mechanism 34 comprises an upper part 86 and a lower part 88 that are telescopically received in one another such that the support pillar 42 of the mechanism can be shortened for transport or lengthened when deployed. In addition, support pillar or shaft 42 is telescopically coupleable to a base member 92, which in the embodiment shown is a pointed stake with a cylindrical opening on its upper end. The telescoping relationships between the upper and lower portions 86, 88 of support pillar 42 and support pillar 42 versus base member 92 are shown in FIG. 6. In the depicted embodiment a hollow stake shaft has a point 94 on the bottom by which the stake shaft is pressed into the ground. Similarly, the stake shaft or other base member can define an upwardly oriented shank that is telescopically received within a hollow lower part of the support pillar shaft. That is, the male/female relationships of the telescoping parts can be reversed or otherwise varied while retaining their telescoping and/or relatively rotatable engagement, as will be readily apparent.

Again referring to FIG. 3, the user reaches manually into the hollow decoy body 25 to grasp and move slider hub 66 upwardly (to expand body 25 and deploy the decoy) or downwardly (to permit body 25 to collapse). For reaching into the hollow interior, a relatively large opening 96 is provided between the molded lateral halves of decoy body 25 along the centerline seam 38 at the lower rear. More particularly, the user reaches into body 25 and grasps slider hub 66 with one hand, and grasps support pillar 42 with the other hand, outside body 25. The user then either slides hub 66 upwardly over latching body 78 or depresses latching body 78 and draws or allows hub 66 to move downwardly.

The mechanism including support pillar 42, bracing members 56 and linkage 64 with strut 68 is a distinct unit that is insertable in the collapsible hollow decoy body 25 and movable to the deployed position for positively expanding said decoy body 25. As shown in FIGS. 3–5, the mechanism 34 can be attached via a threadable fastener 46 to body 25. Accordingly, the mechanism readily can be retrofit into a conventional decoy body of the type formerly supported rotatably on a grommet rested atop a pointed shaft.

In the embodiment shown, a plurality of bracing members 56 are coupled to the end boss 58 of support pillar 42 and are positioned as a function of their connections via struts 68 to slidable hub 66, and by the longitudinal position of the slidable hub 66 along support pillar 42. It is also possible to employ a different shape for sliding hub 66, in lieu of struts 68, to operatively move bracing members 56 outwardly or to retract the bracing members. For example, the sliding hub 66 can be a rounded body (not shown), for example having a hemispherical upwardly facing side, or a conical upward facing side, movable relative to latching body 78 of the spring lock 76 such that sliding hub 66 rests directly against bracing members 56 and pivots the bracing members outwardly at the required angle when sliding hub 66 is moved upwardly over latching body 78 of the spring lock. In addition, spring lock 76 can be omitted, particularly if the helical spring 74 is also omitted, and in that case sliding hub 66 can be held at any desired distance from top end boss 58 by frictional coupling between sliding hub 66 and support pillar 42.

Although mechanism shown resembles a portion of an umbrella mechanism, bracing members 56 at their furthest pivoted outward position remain at an acute angle relative to the elongation of support pillar 42, whereas the bracing members of an umbrella or similar structure generally open to a right angle relative to the umbrella handle shaft. In addition, bracing members 56 are shown as straight lengths, for example of thin steel stampings. According to a further variant (not shown), bracing members 56 can be curved to more nearly complement the internal shape of hollow decoy body 25 when expanded into the deployed shape, for example being rounded downwardly and/or radially inwardly at a space from end boss 58.

Bracing members 56 need not be all of the same length, nor must the bracing members be evenly angularly spaced around support pillar or shaft 42. For example, certain bracing members that extend substantially longitudinally relative to the body can be relatively longer than those that extend laterally complement the dimensions of the hollow cavity in body 25, which is longer than it is wide. As presently preferred, however, bracing members 56 are coupled diametrically opposite to one another on support pillar 42 and are of an equal length, namely substantially the length required for the laterally disposed bracing members to urge the sides of hollow decoy body 25 outwardly into their nominal expanded state. In this manner it is not necessary to align the mechanism 34 with decoy body 25 because any rotational alignment will produce the same functional result.

Figure 7:
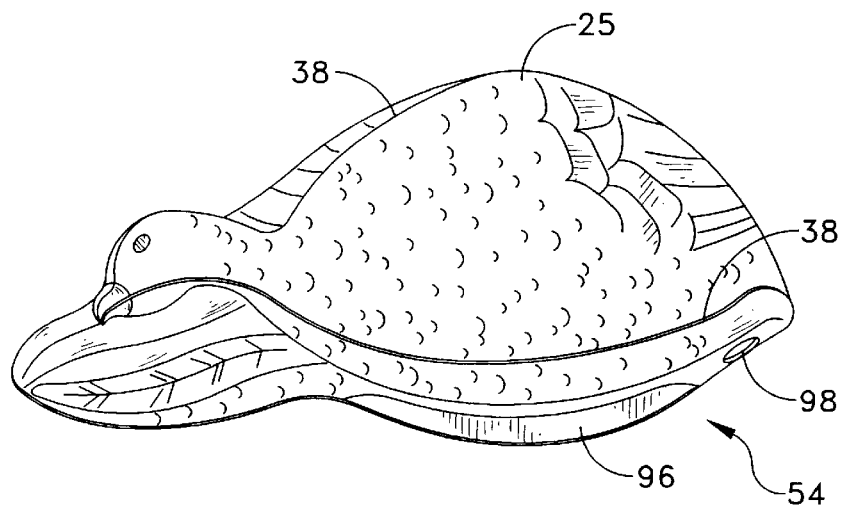
FIG. 7 is a plan view showing the decoy body collapsed and folded for storage.
Figure 8:
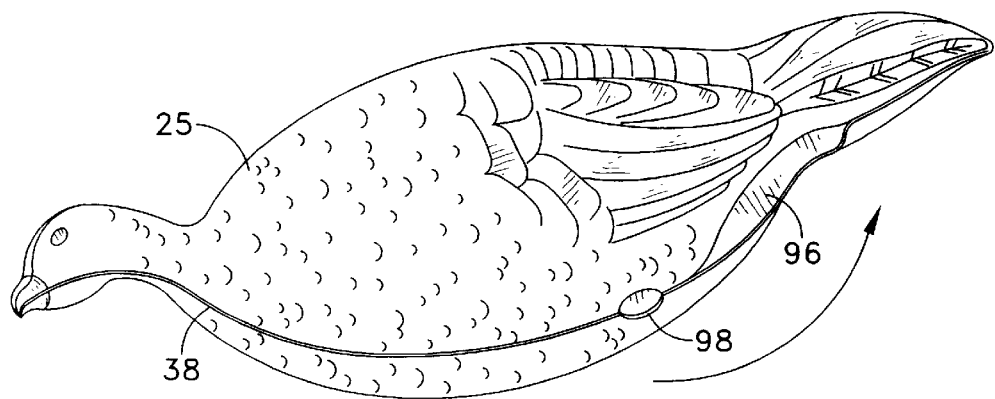
FIG. 8 is a plan view corresponding to FIG. 7 with the decoy body unfolded.

FIGS. 7 and 8 demonstrate the manner in which the decoy body 25 is collapsed. In FIG. 7, the lateral sides of the hollow body are pressed inwardly such that the body 25 is substantially flattened, and the opposite surfaces of the internal cavity rest against one another. The flexible lateral sides are generally bowl shaped as molded. The bowl shapes are stable either when rounded outwardly as when the decoy body 25 is expanded and deployed, or when pressed and rounded inwardly such that the curve of the respective bowl shaped side is outwardly concave rather than outwardly convex as it is in the expanded state. As also shown in FIG. 7, decoy body 25 can be folded over when collapsed in this manner to make the body even more compact. The expander according to one of the foregoing embodiments of FIGS. 2a–2c resides between the collapsed side walls, with the expander either being aligned to place its thinnest dimension between the side walls, or having retractable bracing member(s) withdrawn against the central support pillar/shaft 42.

Figure 9:
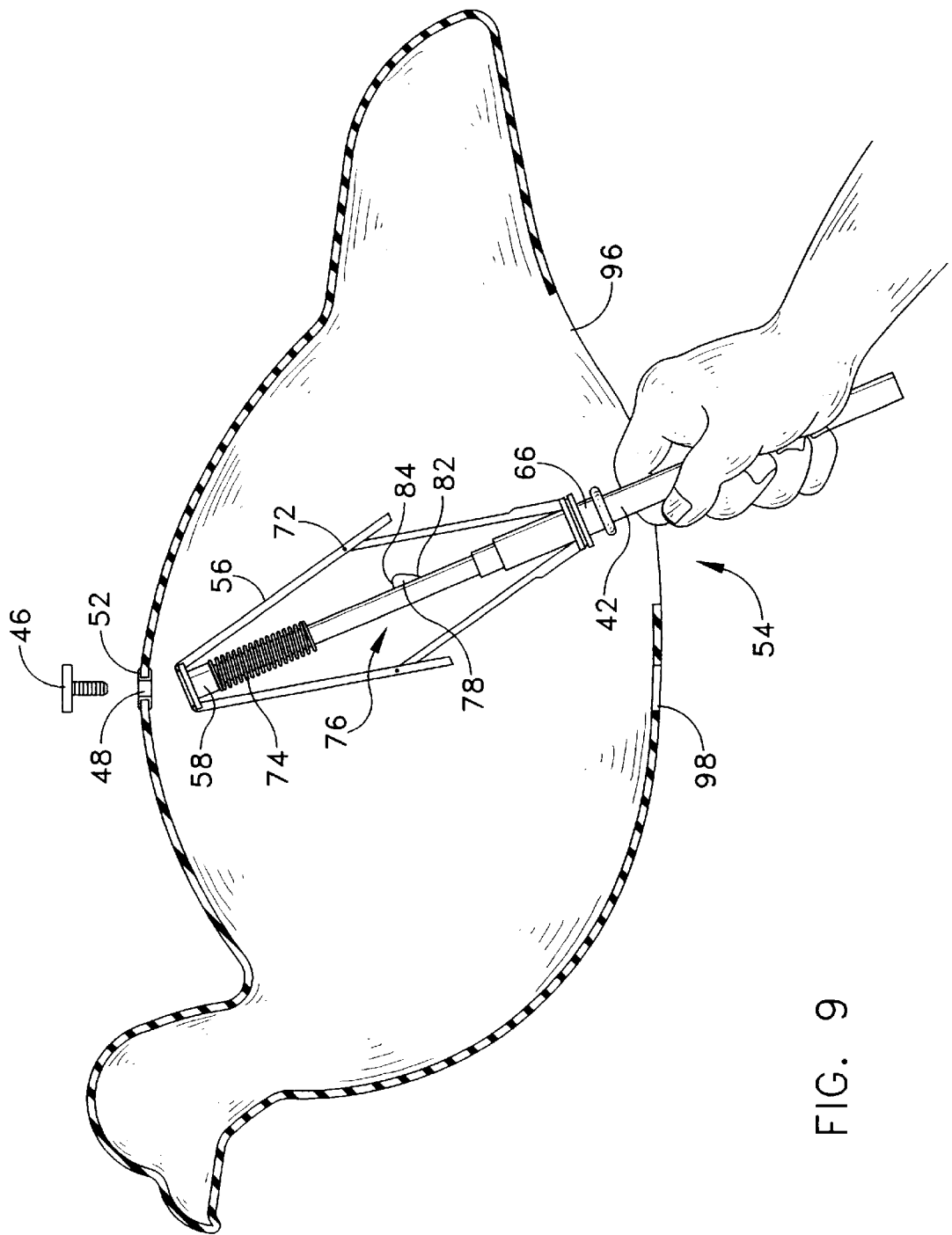
FIG. 9 is a longitudinal section view showing an initial step in installation of the expansion mechanism is a decoy body, either initially or as a retrofit.

To deploy body 25 as in FIG. 8, the body is unfolded as shown by the arrow. In addition, the laterally pressed-in side is reversed from its concave condition and caused to curve outwardly in a convex shape by rotation of the expander into the position shown in FIGS. 2a or 2b, or by mechanical action of mechanism 34 of FIG. 2c. FIG. 9 demonstrates how the mechanical version of the expander can be retrofit and used in an existing hollow decoy body and operates in combination with such body. The integral versions of FIGS. 2a and 2b can likewise be retrofit in a similar manner. Each of the embodiments provides a decoy 20 that can be deployed very quickly and silently because a simple motion expands and deploys the decoy.

The expander is manually set into the hollow body 25 as shown in FIG. 9 while reaching through the larger opening 54 in the underside of body 25. In FIG. 9 the expander is affixed on its upper end to hollow body 25 by threaded fastener 46, which extends through opening 48 in the back of hollow body 25 and threads into the end of support pillar 42. It is also preferred that the bottom end 44 of the shaft 42 be extended through a separate hole 98 provided therefor in the bottom of body 25. This can be done by stretching the bottom of body 25 over the bottom end of support pillar 42, preferably before affixing the fastener at the top. Alternatively, the fastener can be omitted as discussed above.

Figure 10:
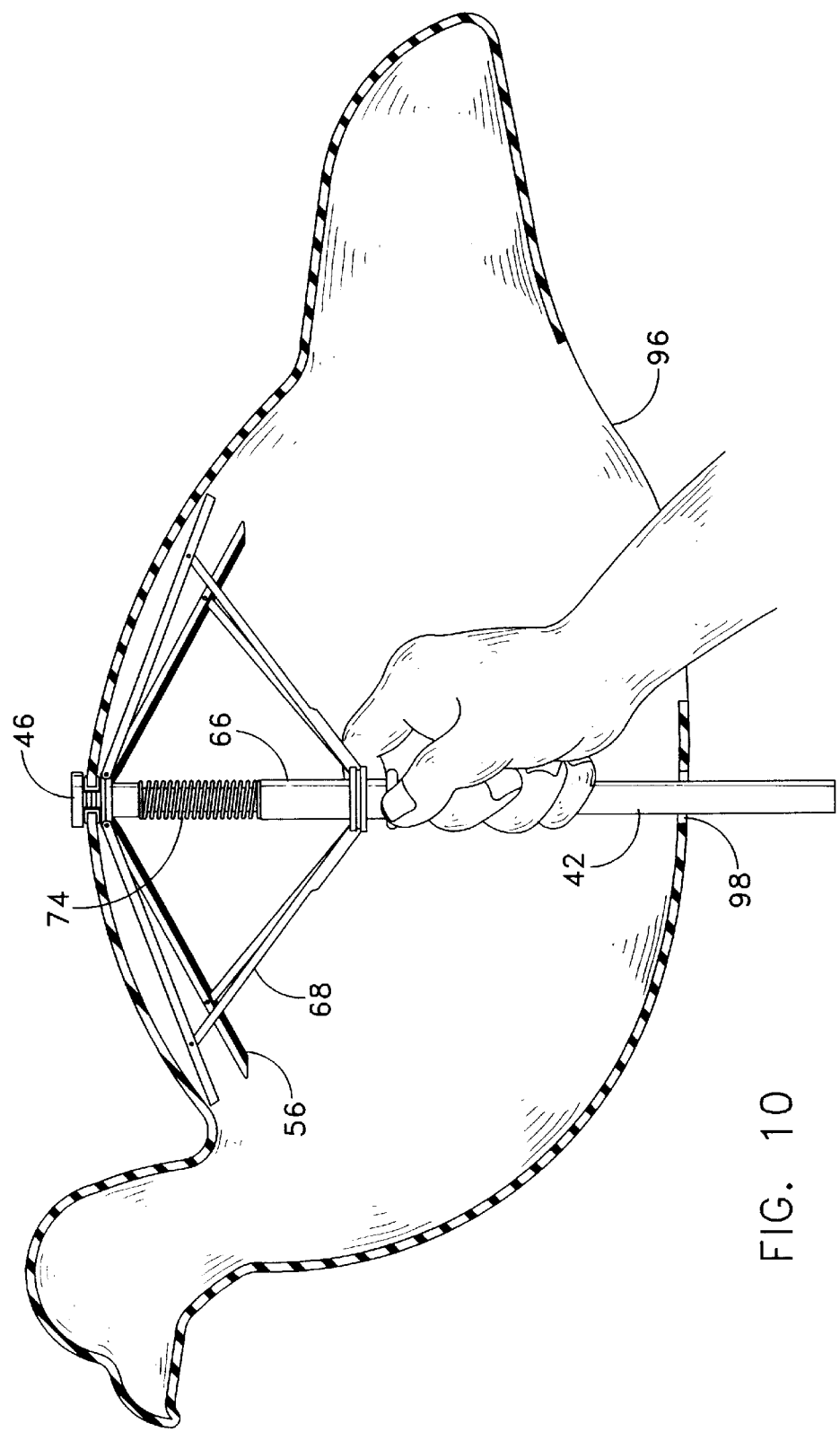
FIG. 10 is a longitudinal section view corresponding to FIG. 9, showing operation of the expansion mechanism to positively expand the decoy body.

FIG. 10 shows the bottom end of the expander as inserted through opening 98 in the bottom of body 25 from inside, prior to attaching the top end via threaded fastener 46. The user then rotates the integral expander to place its wider dimension perpendicular to the longitudinal axis of body 25, or expands the mechanical version by sliding hub 66 upwardly to cause bracing members 56 to diverge from one another and from support pillar 42, at least in a direction perpendicular to the longitudinal axis of the body. This positively holds decoy body 25 in its expanded deployed position.

Figure 11:
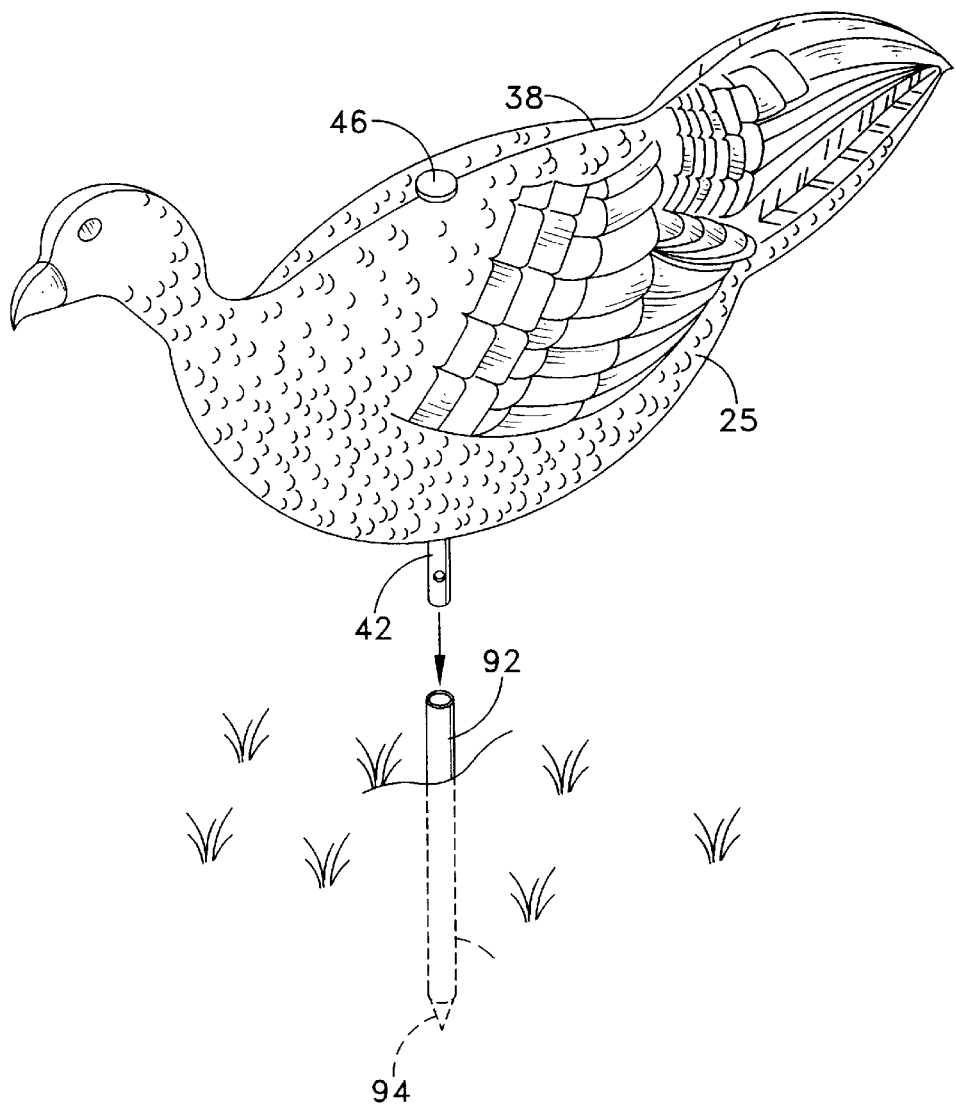
FIG. 11 is a perspective view showing rotatable mounting of the expanded decoy body in a ground fixture.
Figure 12:
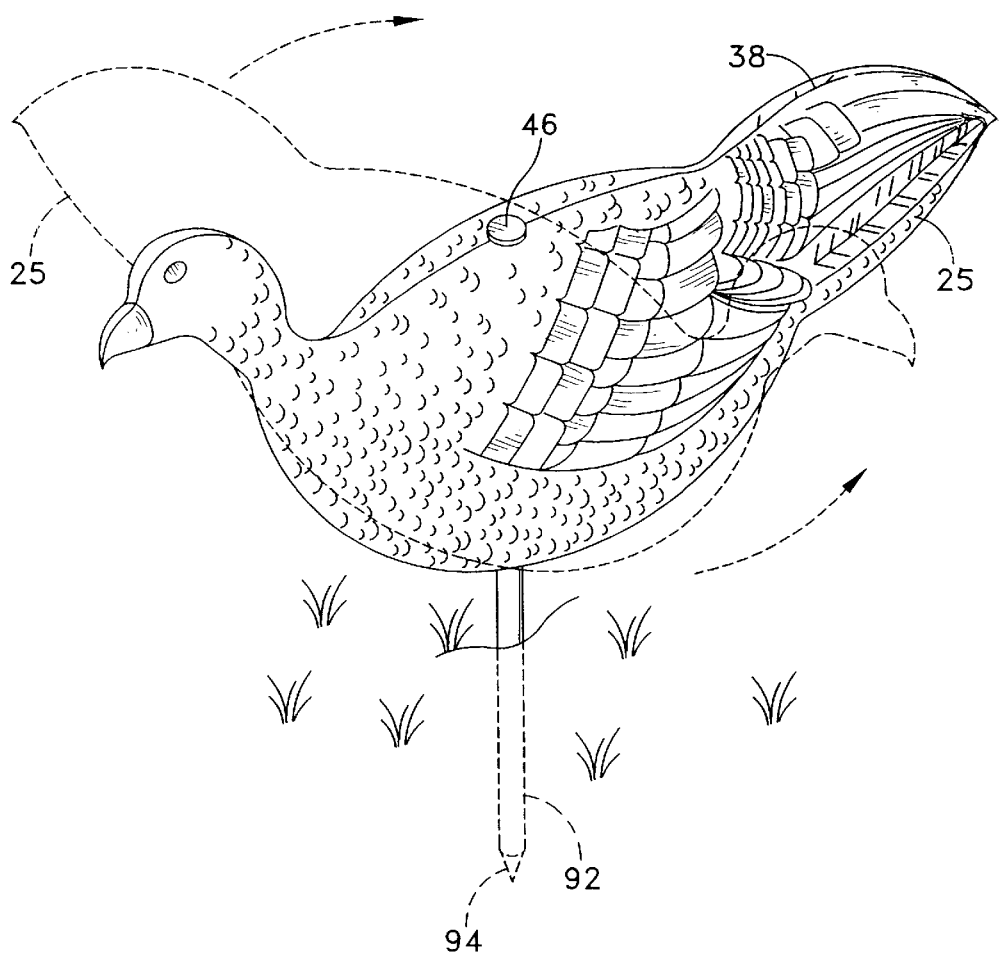
FIG. 12 is a perspective view including phantom lines illustrating rotation of the decoy body relative to the ground fixture.

In FIG. 11 the expanded decoy body is shown being inserted into and telescopically received in the base member or ground stake 92, pressed into the ground. In a simple embodiment, the bottom part 88 of support pillar 42 can be simply pressed into the ground or other underlayment. A rotational coupling between pillar 42 and a base member 92 is also possible, and as shown in FIG. 12 allows decoy 20 to rotate freely. The decoy body 25 is generally elongated rearwardly, and as a result the body rotates on base member 92 in the manner of a weathervane in the ambient wind. Such motion contributes to the realism of the simulation presented by the decoy, particularly if the wind causes several adjacently deployed decoys to rotate to face upwind.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. An expander for a collapsible animal decoy, the decoy having a hollow decoy body that is flexibly collapsible and expandable by displacing opposite walls of the decoy body toward and away from one another, the expander comprising:

at least one support pillar attachable to the decoy body, the support pillar being operative to support the decoy body relative to an underlayment;

at least one bracing member insertable into the decoy body between said opposite walls, the bracing member being movable to define different widths in at least two alternate states corresponding to expanded and collapsed states of the expander, wherein at least a portion of the bracing member is movable radially toward and away from an axis defined by the support pillar for respectively collapsing and expanding the decoy body, wherein the bracing member is pivotable on an axis perpendicular to the axis defined by the support pillar, thereby angularly diverting the bracing member from the support pillar and spacing said portion of the bracing member from the axis of the support pillar, and further comprising a slidable hub on the support pillar, wherein axially advancing and retracting the hub on the support pillar pivots the bracing member between said alternate states for collapsing and expanding the decoy body.

2. The expander of claim 1, wherein the bracing member comprises at least one arm extending from the axis defined by the support pillar by a distance substantially corresponding to a space between the opposite walls of the decoy body in the expanded state.

3. The expander of claim 2, wherein the bracing member comprises arms extending in opposite directions from the axis defined by the support pillar.

4. The expander of claim 1, wherein the axis perpendicular to the axis defined by the support pillar is adjacent to an upper end of the support pillar.

5. The expander of claim 1, wherein the bracing member is attached to the hub via a strut extending from the hub to a point on the bracing member spaced from the pivot axis perpendicular to the axis defined by the support pillar.

6. The expander of claim 1, further comprising a ground post insertable into the underlayment, the support pillar being rotatably coupleable to the ground post.

7. In combination, a collapsible hunting decoy and an expander for the collapsible hunting decoy, the combination comprising:

said hunting decoy having a hollow decoy body that is flexibly collapsible and expandable by displacing opposite walls of the decoy body toward and away from one another;

said expander comprising at least one support pillar attachable to the decoy body, the support pillar being operative to support the decoy body relative to an underlayment and having at least one bracing member disposed in the decoy body between said opposite walls, the bracing member being movable to define different widths in at least two alternate states corresponding to expanded and collapsed states of the decoy body, wherein at least a portion of the bracing member is movable radially toward and away from an axis defined by the support pillar, thereby respectively collapsing and expanding the decoy body, wherein the bracing member is pivotable on an axis perpendicular to the axis defined by the support pillar, thereby angularly diverting the bracing member from the support pillar and spacing said portion of the bracing member from the axis of the support pillar; and a slidable hub on the support pillar, and wherein advancing the hub towards the upper end of the pillar pivots the bracing member outward from the support pillar and retracting the hub from the upper end allows the bracing member to approach the support pillar.

8. The combination of claim 7, wherein the bracing member comprises at least one arm extending from the axis defined by the support pillar by a distance substantially corresponding to a space between the opposite walls of the decoy body in the expanded state.

9. The combination of claim 8, wherein the bracing member comprises paired arms extending in opposite directions from the axis defined by the support pillar.

10. In combination, a collapsible hunting decoy and an expander for the collapsible hunting decoy, the combination comprising:

said hunting decoy having a hollow decoy body that is flexibly collapsible and expandable by displacing opposite walls of the decoy body toward and away from one another;

said expander comprising at least one support pillar attachable to the decoy body, the support pillar being operative to support the decoy body relative to an underlayment and having at least one bracing member disposed in the decoy body between said opposite walls, the bracing member being movable to define different widths in at least two alternate states corresponding to expanded and collapsed states of the decoy body, wherein at least a portion of the bracing member is movable radially toward and away from an axis defined by the support pillar, thereby respectively collapsing and expanding the decoy body, wherein the bracing member is pivotable on an axis perpendicular to the axis defined by the support pillar, thereby angularly diverting the bracing member from the support pillar and spacing said portion of the bracing member from the axis of the support pillar, wherein the axis perpendicular to the axis defined by the support pillar is adjacent to an upper end of the support pillar; and a slidable hub on the support pillar, and wherein advancing the hub towards the upper end of the pillar pivots the bracing member outward from the support pillar and retracting the hub from the upper end allows the bracing member to approach the support pillar.

11. A hunting decoy, comprising:

a hollow decoy body that is flexibly collapsible and expandable by displacing opposite walls of the decoy body toward and away from one another;

an expander comprising at least one support pillar attachable to the decoy body, the support pillar being operative to support the decoy body relative to an underlayment and at least one bracing member disposed in the decoy body between said opposite walls, the bracing member having different widths in at least two alternate states corresponding to expanded and collapsed states of the decoy body, wherein the bracing member is movable relative to an axis defined by the support pillar, at least a portion of the bracing member being radially spaced from the support pillar in the expanded state, wherein the bracing member is pivotable on an axis perpendicular to the axis defined by the support pillar, thereby angularly diverting the bracing member from the support pillar and spacing said portion of the bracing member from the axis by said radial portion of said relatively greater distance in the expanded state, the bracing member being pivotable back around the axis perpendicular to the axis defined by the support pillar to bring said portion of the bracing member adjacent to the support pillar in the collapsed state, and wherein said portion of the bracing member is angularly diverted toward and away from the axis of the support pillar by manually displacing a hub axially along the support pillar.

12. The decoy of claim 11, wherein the bracing member comprises paired arms extending in opposite directions from the axis defined by the support pillar.

13. The decoy of claim 11, wherein the pivoting axis of the bracing member is located at an upper end of the support pillar.

14. The hunting decoy of claim 11, wherein the game bird is a turkey.

* * * * *